United States Patent [19]

Temming et al.

[11] Patent Number: 5,176,243

[45] Date of Patent: Jan. 5, 1993

[54] EGG ORIENTING APPARATUS

[75] Inventors: Leonardus J. Temming, Aalten; Willem C. M. Arends, Doetinchem; Johan H. Hessewlink, Aalten, all of Netherlands

[73] Assignee: FPS Food Processing Systems, B.V., Barneveld, Netherlands

[21] Appl. No.: 821,580

[22] Filed: Jan. 16, 1992

[30] Foreign Application Priority Data

May 7, 1991 [NL] Netherlands .......................... 9100786

[51] Int. Cl.⁵ ............................................. B65G 47/24
[52] U.S. Cl. ..................................... 198/400; 198/387
[58] Field of Search .................... 198/399, 400, 387

[56] References Cited

U.S. PATENT DOCUMENTS

| | | | |
|---|---|---|---|
| 3,068,785 | 12/1962 | Ahlburg | 198/387 |
| 3,080,955 | 3/1963 | Fennell | 198/387 |
| 3,311,216 | 3/1967 | Jones | |
| 3,342,012 | 9/1967 | Reading | |
| 3,370,692 | 2/1968 | Mosterd | 198/387 |
| 3,499,520 | 3/1970 | Willsey et al. | 198/400 |
| 3,592,327 | 7/1971 | Koch et al. | 198/400 |
| 3,820,301 | 6/1974 | Willsey | |
| 4,593,805 | 6/1986 | Huddle | 198/400 |
| 4,645,058 | 2/1987 | Meyn | 198/400 |
| 4,730,440 | 3/1988 | Van der Schoot et al. | |

FOREIGN PATENT DOCUMENTS 2003441 3/1979 United Kingdom .

Primary Examiner—Joseph E. Valenza
Attorney, Agent, or Firm—Griffin Butler Whisenhunt & Kurtossy

[57] ABSTRACT

An egg orienting apparatus for orienting the smaller ends of eggs in a predetermined position. The eggs are supplied to the apparatus on rotating rollers of a roller conveyor. At one of the reversing wheels of the conveyor, lifting members are arranged which enable an egg to be lifted relative to one of a pair of egg carrying rollers. According to the invention, at one of the reversing wheels are arranged consisting of pushing members which can be moved faster than the conveyor. The pushing members are arranged approximately at the level of the reversing wheel. Further, lifting members are arranged which release the egg from one of a pair of rollers, so that the egg is enabled to rotate while being supported by the other carrying roller and the lifting members.

15 Claims, 5 Drawing Sheets 5,176,243

EGG ORIENTING APPARATUS

This invention relates to an egg orienting apparatus in which the smaller ends of eggs are oriented in a predetermined position, the eggs being supplied to this apparatus on rotating rollers of a roller conveyor comprising reversing wheels at one of which means are arranged which enable an egg to be lifted relative to one of a pair of egg carrying rollers.

Such an apparatus is for instance disclosed in U.S. Pat. Nos. 3,370,692 and 4,750,316. These patent specifications show a conveyor, adjacent one end of which is arranged a mill comprising wings for cooperation with a resilient element arranged opposite therefrom, in such a manner that the wings of the mill allow the articles, such as eggs, to pass one by one, sliding along the oppositely arranged resilient element and subsequently falling into a receptacle or the like of known design, whence the eggs are conveyed further to a receiving element arranged therebelow.

A disadvantage of the known apparatuses is that a proper positioning of the eggs requires that the centre-to-centre distance between adjacent rows be considerable, taking into account the largest possible length of the articles to be processed, such as eggs in the present case. Further, a proper positioning of the eggs is not always ensured because an egg must find its own way.

The object of the present invention is to remove these disadvantages.

To that end, according to the invention, the apparatus of the type described in the preamble is characterized in that at one of the reversing wheels means are arranged which comprise pushing elements that can be moved faster than the conveyor, the pushing elements being arranged approximately at the level of the reversing wheel of the conveyor and that lifting means are arranged which release the egg from one of a pair of carrying rollers, so that the egg is enabled to rotate while being supported on the other carrying roller and the lifting element.

These pushing elements may be part of the wings of a mill or rotating discs which may or may not be flexible, having a peripheral velocity greater than the speed of the top track of the roller conveyor.

In further elaboration of the invention, the eggs that have been oriented lengthwise on the top track of the conveyor can be transferred to spoon-shaped elements which convert the direction of movement of the products into a substantially vertical direction.

In that case, the spoon-shaped elements can be part of the wings of a mill, which transfer the articles to a further, substantially vertically movable conveyor.

In that case, the axis of rotation of the mill can coincide with the centre of one of the top reversing wheels of the vertical conveying means.

According to another embodiment of the invention, the eggs that have been oriented lengthwise in the top track of the conveyor can be transferred via a chute to a second roller conveyor whose axis is laterally offset in the direction of movement relatively to the axis of the feed roller track, so that the eggs are received laterally of the axis on one of the ascending sidewalls of the rollers and are tilted on one side into the horizontal position. For guiding the eggs along the chute in a controlled manner, a mill can be mounted at the transition, the wings of the mill supporting the eggs in the chute.

To clarify the invention, some embodiments of the egg orienting apparatus will now be described, by way of example, with reference to the accompanying drawings, in which.

Figure 1:
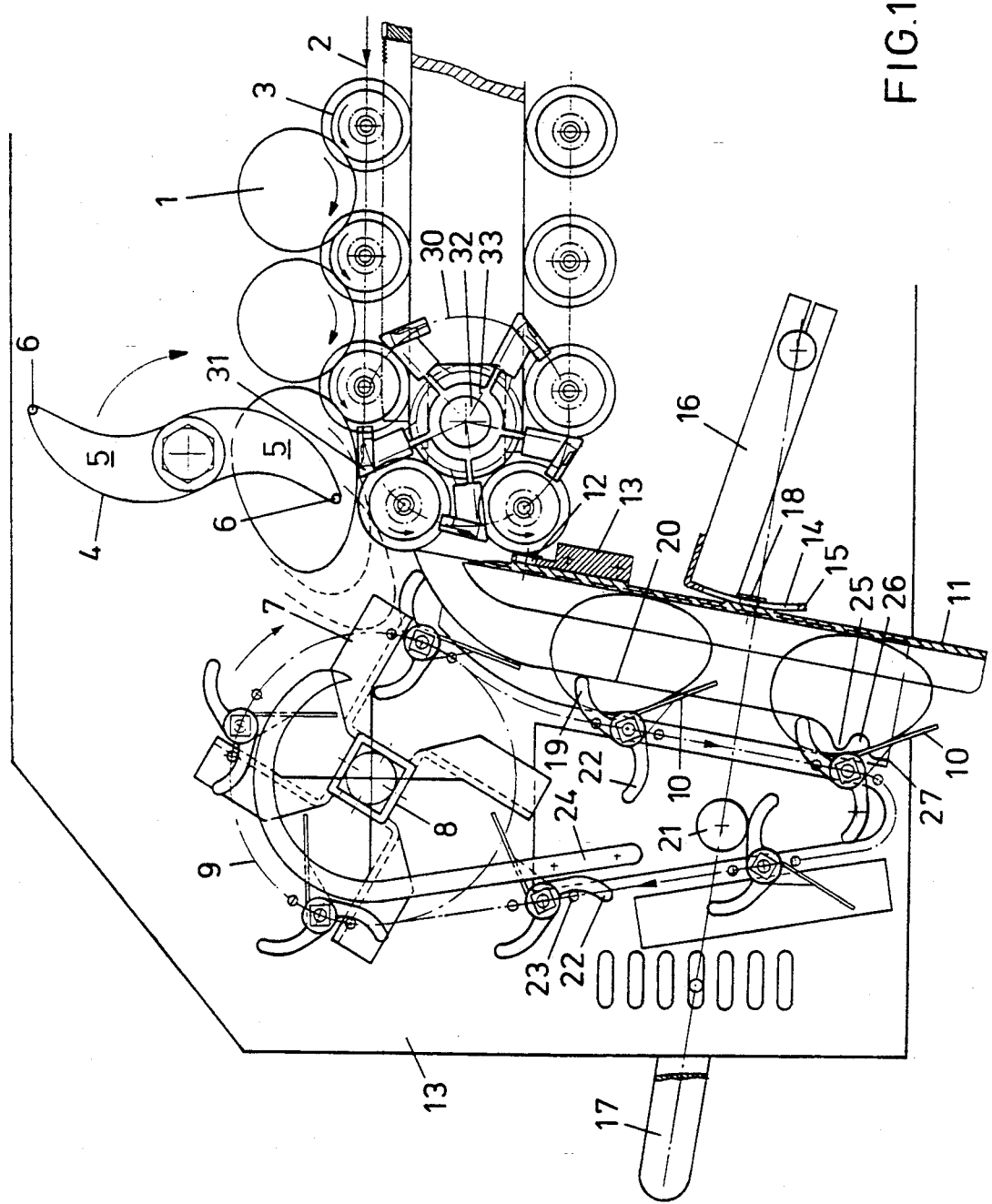
FIG. 1 is a diagrammatic longitudinal section of a part of an orienting apparatus according to the invention.

Referring to the drawing, there is shown an egg orienting apparatus designed for conveying and orienting eggs, comprising a conveyor 2 fitted with rollers 3 which in a known manner have a concave shape such that the diameter thereof increases from the middle towards the periphery thereof. The conveyor 2 is passed over reversing wheels 30 of which one is shown in this case. Further, provided on the shafts for the rollers 3 are members comprising pinions which can cooperate with pinions arranged adjacent the top track of the conveyor 2, so that a continuous rotation of the rollers is ensured.

Mounted adjacent the reversing wheel 30 on the shaft 32 thereof is a "star" 33. Provided at the free end of each arm of the star is a lifting member 31 adapted to lift each egg or other article that is being supplied by the rollers, and release it from the roller 3 in question.

Figure 2:
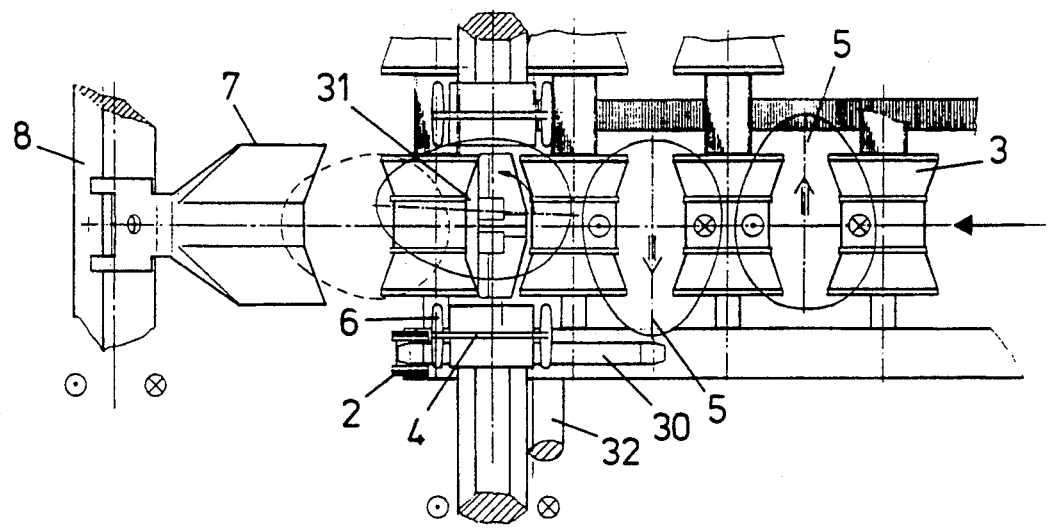
FIG. 2 is a top plan view of the apparatus according to FIG. 1.
Figure 5A:
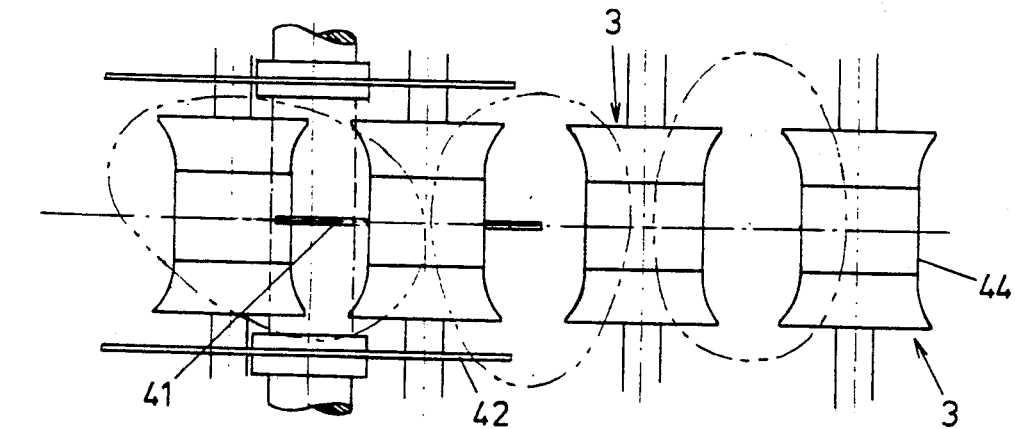
FIG. 5A is a top plan view and FIG. 5B is a longitudinal section of an embodiment comprising rotating discs.
Figure 5B:
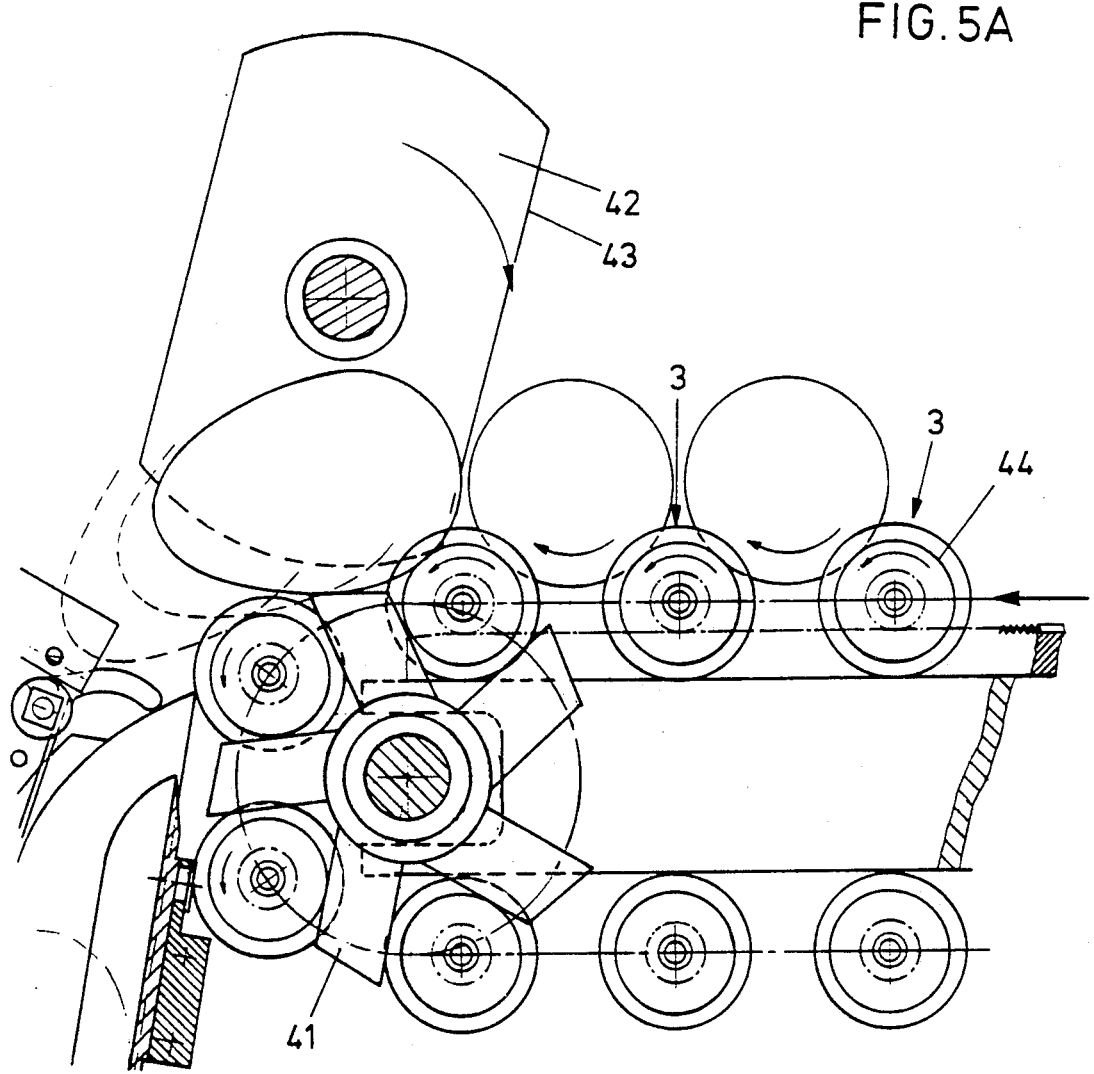

Arranged above the conveyor is a mill 4 having wings 5 with ends or pushing members 6 moving at a higher speed than the conveyor 2. In the embodiment shown, the mill comprises two wings 6 extending on opposite sides, each comprising ends 6. As will appear from the drawing (see FIG. 2 in particular), the wings of the mill 4 are so arranged that upon rotation thereof the smaller end of an incorrectly disposed egg will be pushed in the proper direction, its longitudinal axis oriented in the direction of transport. The rotation of the egg is facilitated by a raised, knife-edged portion 40 of the lifting member 31, as shown in particular in FIG. 3. An alternative design of such a knife-edged portion is shown in FIGS. 5A and 5B. Each egg will thus have its longitudinal axis oriented in the direction of travel of the conveyor, more particularly, its smaller end pointing in the direction of transport. In this way it is ensured that each egg will be in a predetermined position just before its transfer.

Figure 3:
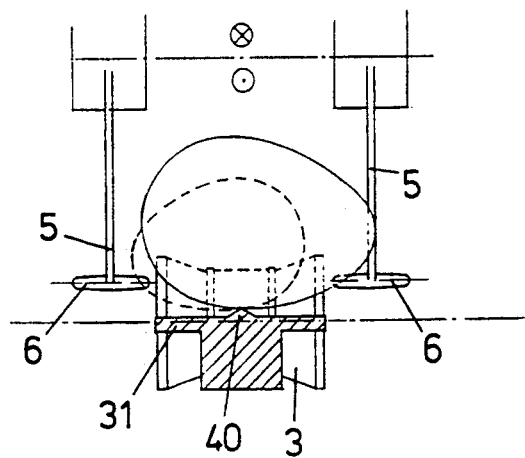
FIG. 3 is a section taken on line III—III of FIG. 1.
Figure 4A:
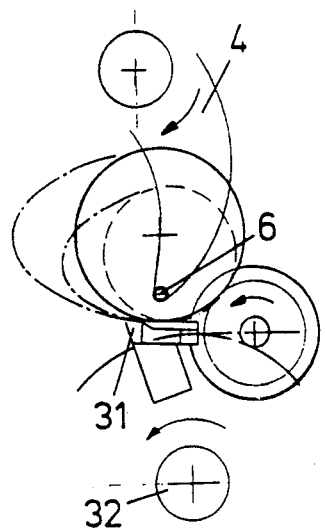
FIG. 4a is a part of a side elevation similar to FIG. 1 during orientation of an egg.
Figure 4B:
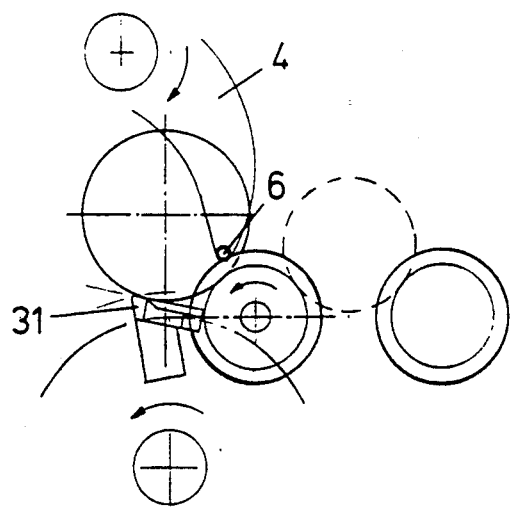
FIG. 4b is a view similar to FIG. 4A at a different time during orientation.

Further, the apparatus is so designed that both large and small eggs can be processed with it, as can be clearly seen from FIGS. 3, 4A, and 4B.

Downstream of and in alignment with the conveyor 2, a mill may be arranged comprising wings 7 and a mill shaft 8. The mill shaft 8 may also serve as a shaft for a reversing wheel (not shown) of a conveyor chain 9, the details of which are described in applicant's pending Netherlands patent application 9100785. This conveyor chain serves for further conveying articles such as eggs to a following processing station.

FIGS. 5A and 5B show an embodiment in which the pushing means comprise rotating discs 42 which may be of flexible design and have cutaway parts 43 of segment shape or similar shape. Further, the rollers 3 are formed with a cylindrical middle portion 44 which during rotation thereof will move an egg in the direction of its smaller end. This cylindrical portion can be made of a material of a relatively low coefficient of friction relative to the surface of the egg.

Figure 6:
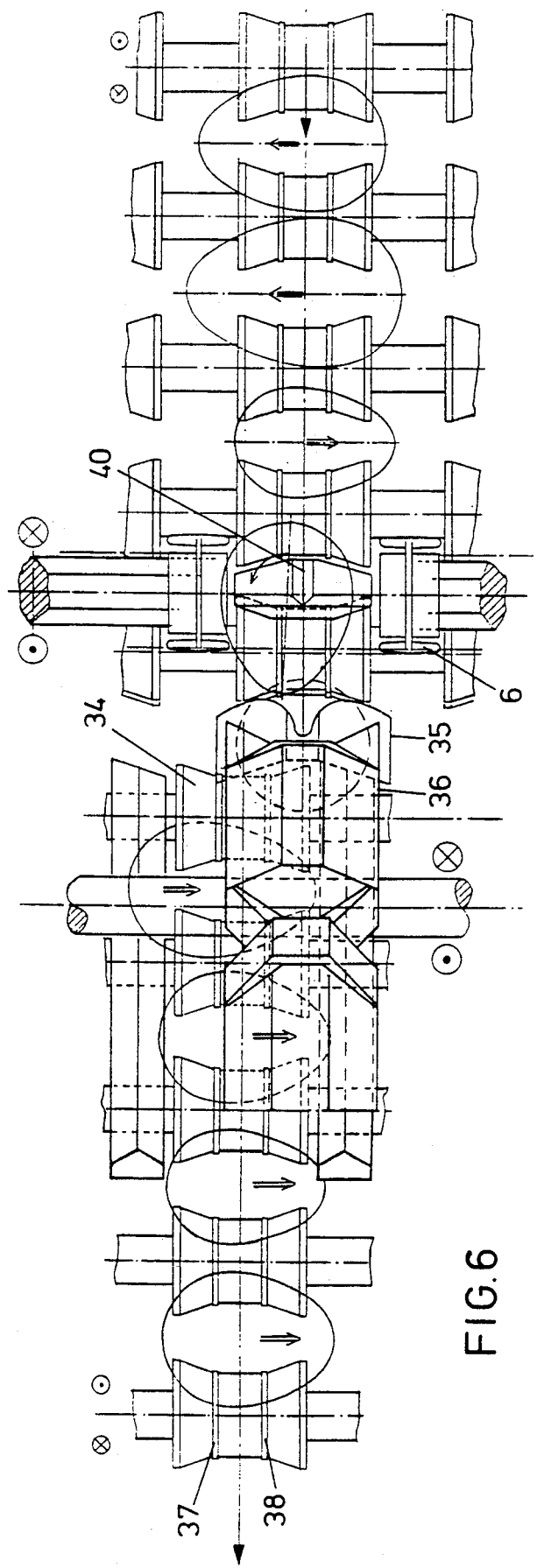
FIG. 6 is a view similar to FIG. 2 of another embodiment of the egg orienting apparatus.

The embodiment shown in FIG. 6 is a construction of which the right-hand part essentially corresponds entirely with the construction described with reference to FIGS. 1-4 and will therefore not be described in detail here. By contrast, the left-hand part of the apparatus of FIG. 6 does not comprise a vertical conveyor as in the apparatus of FIGS. 1-5, but comprises a second conveyor, likewise extending substantially horizontally, carrying the eggs in oriented position, i.e., the longitudinal axis of the eggs is oriented transversely to the direction of transport and the smaller ends of the eggs all point to one side. To ensure that the eggs are disposed in a centered position on the rollers indicated at 34 and maintained in that position, each roller 34 comprises two small annular raised portions 37, 38.

As the drive of the rollers and the various chains is effected in a known manner, the respective drive elements involved are not shown for the sake of clarity.

What we claim is:

1. An egg orienting apparatus in which the smaller ends of eggs are oriented in a predetermined position, the eggs being supplied to the apparatus on rotating rollers of a roller conveyor comprising reversing wheels, at one of which means are arranged which enable an egg to be lifted relative to one of a pair of egg carrying rollers, characterized in that at one of the reversing wheels means are arranged which comprise pushing members that can be moved faster than the conveyor, said pushing members being arranged approximately at the level of the reversing wheel, and that lifting means are arranged which release the egg from one of a pair of rollers, so that the egg is enabled to rotate while being supported by the other carrying roller and the lifting means.

2. An egg orienting apparatus as claimed in claim 1, characterized in that the pushing members are part of the wings of a mill having a peripheral velocity greater than the speed of the top track of the roller conveyor.

3. An egg orienting apparatus as claimed in claim 1, characterized in that the pushing members consist of rotating discs having a peripheral velocity greater than the speed of the roller conveyor.

4. An egg orienting apparatus as claimed in claim 3, characterized in that the rotating discs are flexible.

5. An egg orienting apparatus as claimed in claim 4, characterized in that one or more segments or similar parts have been removed from the disc.

6. An egg orienting apparatus as claimed in claim 1, characterized in that the lifting means comprise a raised portion extending between the rollers in the direction of travel thereof.

7. An egg orienting apparatus as claimed in claim 6, characterized in that the raised portion is knife-edged.

8. An egg orienting apparatus as claimed in claim 1, characterized in that the rotating rollers have a concave or similar shape.

9. An egg orienting apparatus as claimed in claim 8, characterized in that the middle portion of each rotating roller is substantially cylindrical.

10. An egg orienting apparatus as claimed in claim 9, characterized in that at least this middle portion has a low coefficient of friction relative to the egg shell.

11. An egg orienting apparatus as claimed in claim 1, characterized in that the eggs that have been oriented lengthwise in the top track of the conveyor are transferred to spoon-shaped elements which convert the direction of movement into a substantially vertical direction.

12. An egg orienting apparatus as claimed in claim 11, characterized in that the spoon-shaped elements are part of the wings of a mill which subsequently transfer the eggs to further substantially vertically moving conveying members.

13. An egg orienting apparatus as claimed in claim 11, characterized in that the axis of rotation of the mill coincides with the centre of the upper reversing wheels of the vertical conveying members.

14. An egg orienting apparatus as claimed in claim 1, characterized in that the eggs that have been oriented lengthwise in the top track of the conveyor are transferred via a chute to a second roller conveyor whose axis is laterally offset in the direction of transport relative to the axis of the supply roller track, so that the eggs are received laterally of the axis on one of the ascending sidewalls of the rollers and are tilted on one side into the horizontal position.

15. An egg orienting apparatus as claimed in claim 14, characterized in that for controlled guiding of the eggs along the chute a mill is mounted at the transition, having wings which support the eggs in the chute.

* * * * *